Figure 14:
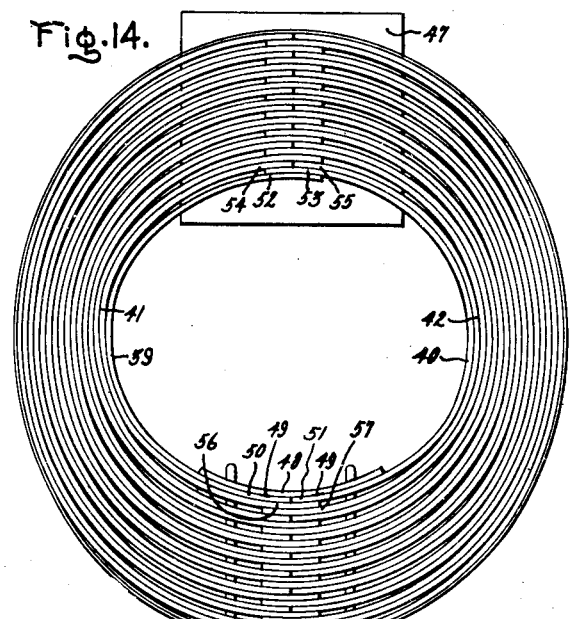

July 26, 1949.  G. G. SOMERVILLE  2,477,350
ELECTROMAGNETIC INDUCTION APPARATUS
AND METHOD OF FORMING SAME
Filed Sept. 11, 1944  4 Sheets-Sheet 1
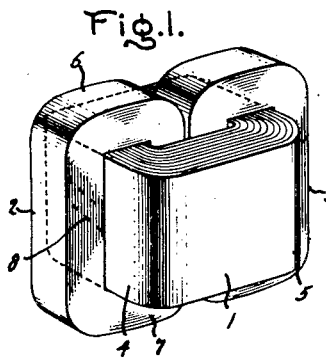
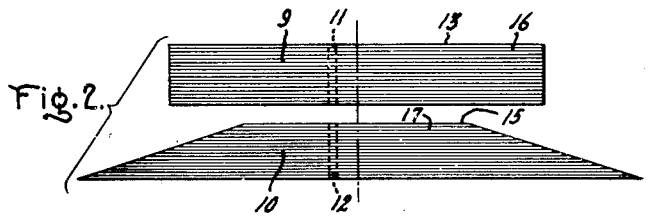
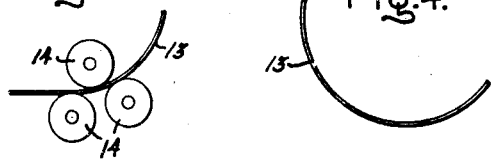
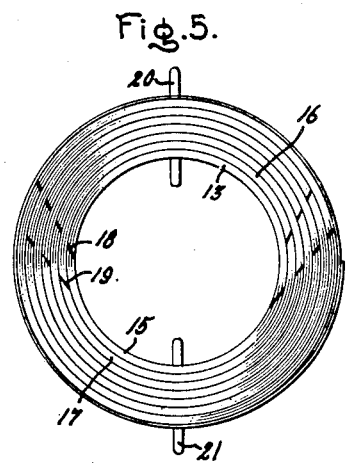
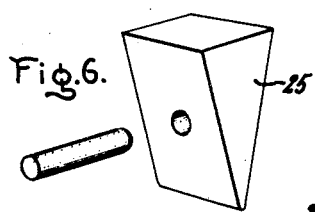
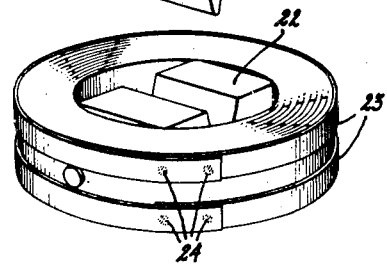
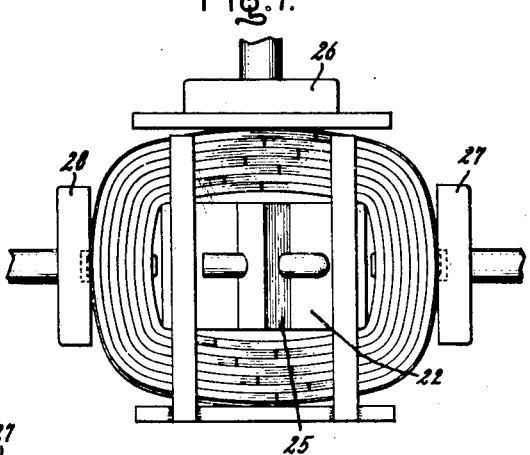
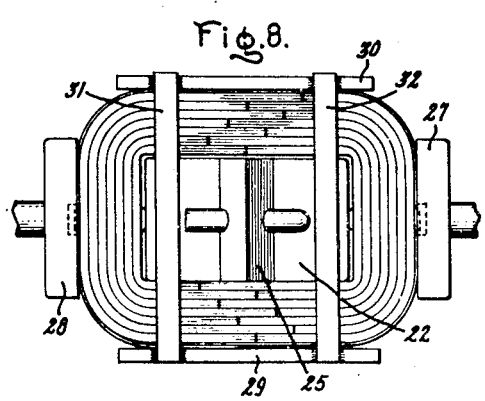
Inventor:
Gareth G. Somerville,
by Harry E. Dunham
His Attorney.

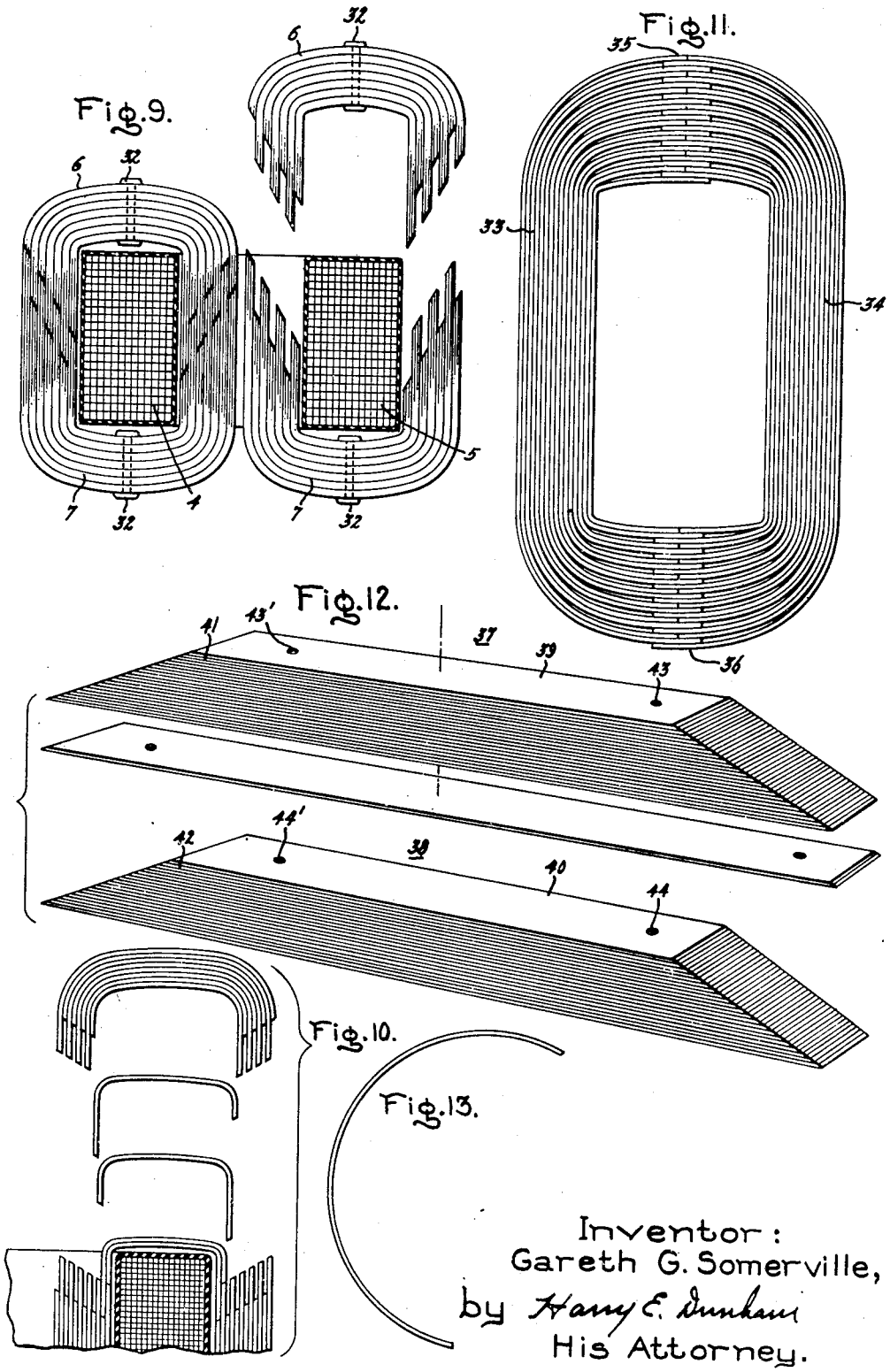

Inventor:
Gareth G. Somerville
by Harry E. Dunham
His Attorney.

July 26, 1949.  G. G. SOMERVILLE  2,477,350
ELECTROMAGNETIC INDUCTION APPARATUS
AND METHOD OF FORMING SAME
Filed Sept. 11, 1944                         4 Sheets-Sheet 4
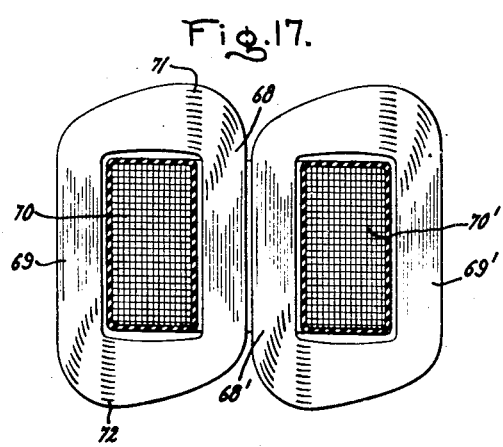
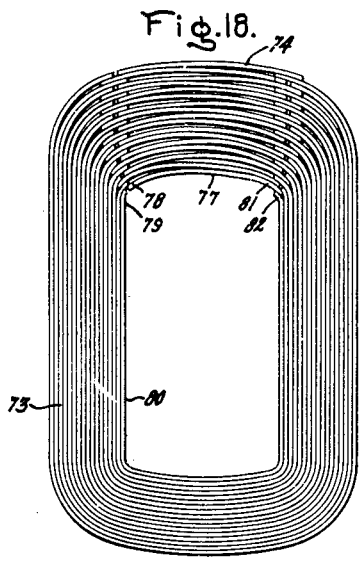
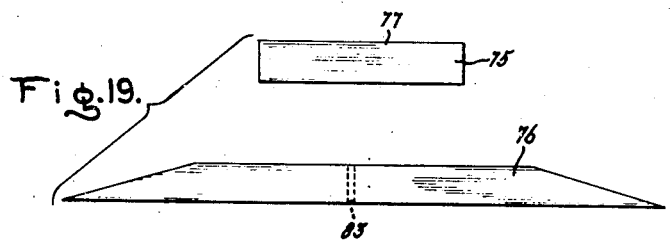
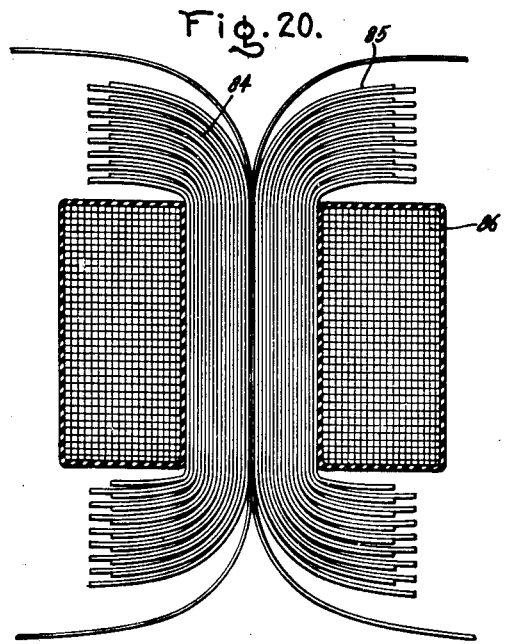
Inventor:
Gareth G. Somerville,
by *Harry E. Dunham*
His Attorney.

Patented July 26, 1949

2,477,350

UNITED STATES PATENT OFFICE 2,477,350

ELECTROMAGNETIC INDUCTION APPARATUS AND METHOD OF FORMING SAME

Gareth G. Somerville, Pittsfield, Mass., assignor to General Electric Company, a corporation of New York Application September 11, 1944, Serial No. 553,523

5 Claims. (Cl. 175—356)

My invention relates to electromagnetic induction apparatus, to magnetic cores of the curved iron type, and to a method of forming the curved iron type core and producing an assembled magnetic core and winding for an electromagnetic induction apparatus.

Heretofore it has been customary to form electromagnetic induction apparatus, particularly for application in low frequency or power frequency fields with magnetic cores formed of a plurality of assembled flat punchings, or by flatwise bending or winding a strip of magnetic material to produce a bent or wound core. In the high frequency field the cores have been produced of powdered iron bonded together with a suitable binder.

A core formed of highly directional steel which is wound in the form of a spiral so that the flux will pass along the most favorable magnetic direction throughout the entire periphery of the core will have a low core loss, and such a core has been used for some time in instrument type bushing current transformers since with this type of transformer it is not necessary to disturb the core to assemble it with the primary winding as the primary winding usually includes a single conductor which passes through the ring shaped core, with a few turns of the secondary winding distributed through and around the ring shaped core. Also, although it has been known since the later part of the last century that cores may be made of the flatwise bent type, for instance as shown in British Patent 7856 of 1889, it has been customary to form cores of electromagnetic induction apparatus by assembling the flat punchings, and apparently one reason for this was the difficulty which was experienced in assembling the annealed wound core with a preformed conductive winding structure without bending the magnetic material beyond its elastic limit, as bending beyond this limit destroys or deteriorates considerably the magnetic properties of the steel.

In my application Serial No. 536,748, filed May 22, 1944, now Patent No. 2,456,457, issued December 14, 1948, and assigned to the same assignee as this present invention, I have described and claimed a curved iron type core for an electromagnetic induction apparatus which may be efficiently applied to a relatively wide range of transformers, and which includes a curved iron type core formed of at least two groups of magnetic sheets which have been precut to the desired size. The core is formed by assembling sheets of first one group and then from the other so as to produce a generally circular shaped core construction. Pressure is then applied to the inside and outside surfaces of the ring so as to suitably align the adjacent ends of the corresponding sheets from each of the groups. The core may then be expanded to the desired shape, annealed, and after annealing one group is disassembled from the second to form two core portions which portions may then be reassembled around a preformed conductive winding structure.

It is an object of the present invention to provide an improved method of forming a core of the above-mentioned type.

It is another object of my invention to provide an efficient method of producing an assembled magnetic core and winding for an electromagnetic induction apparatus which is simple to practice and which will produce an efficient apparatus.

It is a further object of my invention to provide an electromagnetic induction apparatus having a core with an improved joint construction.

Further objects and advantages of my invention will become apparent from the following description referring to the accompanying drawing, and the features of novelty which characterize my invention will be pointed out with particularity in the claims annexed to and forming a part of this specification.

Figure 15:
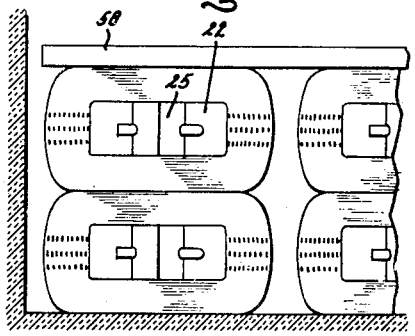
Figure 16:
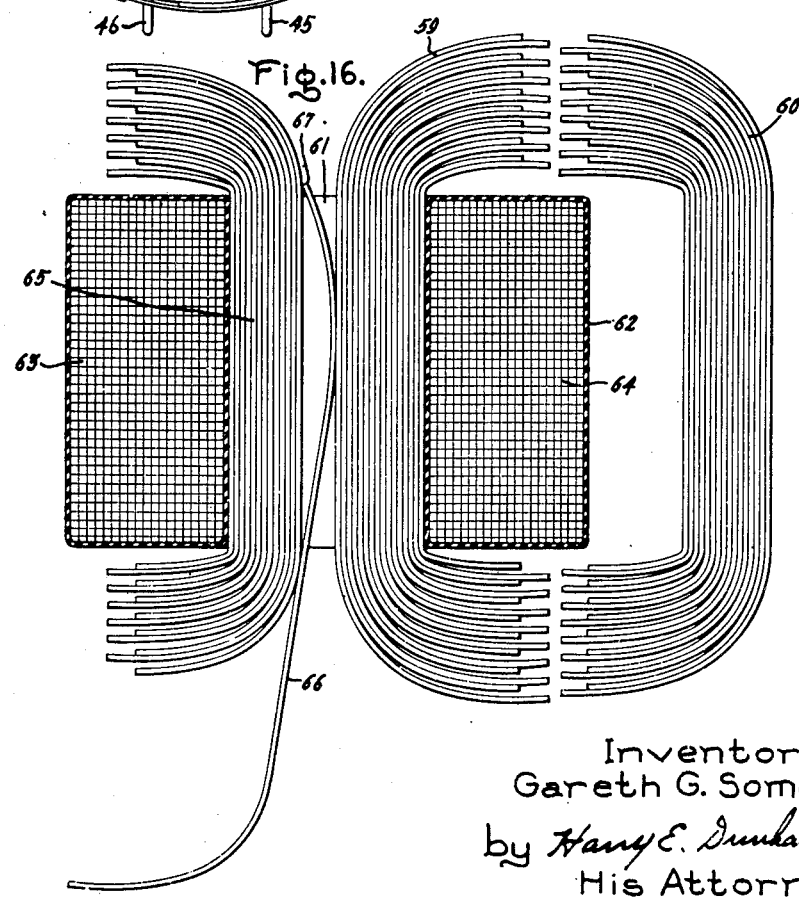

In the drawing Fig. 1 is a perspective view of an electromagnetic induction apparatus which is provided with an embodiment of my invention; Fig. 2 illustrates two groups of sheets of magnetic material which are employed to produce the cores of Fig. 1; Figs. 3 and 4 illustrate steps of bending the sheets of the groups of Fig. 2; Fig. 5 illustrates the groups of sheets having been assembled according to my invention; Fig. 6 is a perspective view of the core of Fig. 5, and an expanding mandrel; Figs. 7 and 8 illustrate the steps of forming the generally toroidally shaped core into a rectangular shaped core construction; Fig. 9 illustrates the apparatus of Fig. 1 with one of the core members being assembled around one leg of the conductive winding structure, and the other core in the process of being assembled; Fig. 10 illustrates another method of assembling the sheets around a winding leg; Fig. 11 illustrates a core construction which is provided with a modification of my invention; Fig. 12 illustrates in perspective two groups of magnetic sheets which are employed in the core of Fig. 11; Fig. 13 illustrates one of the sheets of the group of Fig. 12 after it has been given a bending operation; Fig. 14 illustrates a core having been assembled from the groups of laminations illustrated in Fig. 12; Fig. 15 illustrates somewhat diagrammatically a plurality of cores of the type illustrated in Fig. 11 being assembled in an oven for a strain anneal treatment; Fig. 16 illustrates cores of the type shown in Fig. 11 being assembled around the winding legs of a conductive winding structure; Figs. 17 and 18 illustrate modifications of the core construction illustrated in Fig. 11; Fig. 19 illustrates two groups of sheets used in forming the core of Fig. 18; and Fig. 20 illustrates a modified method of assembling cores of the type illustrated in Figs. 11 through 16 with a conductive winding.

Referring to Fig. 1 of the drawing, I have illustrated an electromagnetic induction apparatus having a preformed coil winding 1 with two similar cores 2 and 3 surrounding legs 4 and 5 respectively of the preformed conductive winding structure. Each of the core portions 2 and 3 includes generally U-shaped core portions 6 and 7 with an overlap butt joint 8 between corresponding ends of the legs of the generally U-shaped portions. In Fig. 1 I have illustrated a joint 8 as being what I term an overlap scarfed butt joint, but it will be understood as the description proceeds, that any suitable type joint construction may be produced according to my improved method. Although two cores are shown as linking a single conductive winding structure it will be understood that my improved method may be user to form any suitable number of core members assembled with any suitable number of conductive winding structures, and to produce any suitable type of electromagnetic induction apparatus, such as a transformer or a reactor. Furthermore, my invention may be used to produce an electromagnetic induction apparatus for a wide range of sizes and applications, such as cores employing relatively thin magnetic strips to produce relatively small transformers for high frequency applications, the cores using relatively thick strips for the large type transformers.

In order to produce the core illustrated in Fig. 1, I provide two groups of magnetic sheets 9 and 10, as shown in Fig. 2. These sheets of magnetic material may be formed of any suitable material such as highly directional strip steel having the most favorable magnetic direction running longitudinally of the sheet. The two groups 9 and 10 of magnetic sheets have approximately the same number of sheets, and the sheets have such length so that corresponding sheets from each of the groups when assembled will have a total length approximately equal to the peripheral distance around the core at that particular layer in the finished core. Of course, they may have any other suitable length. Thus given the size of the finished core the designer can calculate the lengths of each of the sheets of the two groups which will be used to form the finished core. It will also be seen that by the use of the various combinations of lengths of sheets of the two groups, any suitable type of scarfed, butt, or overlapped joint may be provided as will be brought out more clearly below.

In the production of the overlap scarfed butt joint, as shown in Fig. 1, and as indicated by the numeral 8, I provide the one group 9 with each sheet having approximately the same length. The sheets forming the group 10, however, have progressively different lengths, the shortest length being used at the inner perimeter of the finished core and the corresponding longer length being used toward the outer periphery. The magnetic sheets may be cut to size in any suitable manner, such as measuring by hand and cutting to the proper size or they may be cut on my improved index shearing machine, described and claimed in my application Serial No. 539,255, filed June 8, 1944, now Patent No. 2,369,617, issued February 13, 1945, and assigned to the same assignee as this present invention. Such an index shearing machine will produce sheets of progressively different lengths so as to produce the group 10. Furthermore, openings or holes 11 and 12 may be punched in each of the sheets as they are cut. These holes may be punched in any suitable place in the sheets and in the two groups of sheets 9 and 10 the holes are punched offset from the longitudinal center of each of the sheets, as will be seen in Fig. 2. It will be understood that the holes 11 and 12 may be omitted if desired but these holes are used to facilitate the assembly of the sheets in the manner which will be described below.

In order to assemble the sheets in the groups 9 and 10, one sheet such as sheet 13 from the group 9 may be passed through a plurality of rollers 14 which are suitably set so as to give the sheet any suitable shape or set such as a substantially semicylindrical shape as is illustrated in Fig. 4. It will be understood that each of the sheets from the group may be given a set in a similar manner and then assembled as is illustrated in Fig. 5. In order that the sheets will be assembled so as to provide a substantially closed core, one sheet from the group 13 and one sheet 15 from the group 10 are assembled with their ends in abutting relation. In like manner a next sheet 16 from the group 9 is placed adjacent the sheet 13, while the next adjacent sheet 17 from the group 10 is placed adjacent the sheet 15 with the ends of the sheets 16 and 17 in abutting relationship. It will be understood that one sheet from each group may be assembled at a time in the manner described above or a plurality of sheets such as 3 or 4 may be assembled together to form layers, each layer including a plurality of sheets from the same group.

In order to stagger the butt joints the sheets are assembled longitudinally displaced so that the joint 18 between the sheets 13 and 15 will not be in registry with the joint 19 between the sheets 16 and 17. This may be accomplished in any suitable manner, and in the construction illustrated in the drawing this is obtained by longitudinally reversing the adjacent sheets from the group. Thus, since the holes 11 and 12 are placed off center, when the sheet 13 is assembled by passing a pin 20 through the hole 11, the longer side of the sheet will extend either to the right or to the left of the pin and in the construction illustrated in Fig. 5 it will be seen that the longer side of the sheet 13 extends to the right of the pin 20. Similarly the sheet 15 is assembled with a pin 21 passing through the hole 12 and with the short side of the sheet 15 extending to the right of the pin and the longer side to the left of the pin 21. In assembling the sheet 16, however, the pin 20 is passed through the hole 11 with the longer side extending in the opposite direction from the sheet 13, or to the left, while the sheet 17 is assembled with the pin 21 passing through the hole 12 with the short side of the sheet 17 extending to the left of the pin. By assembling the sheets in this manner it will be seen that the joints of adjacent layers are staggered and such a method of assembling magnetic sheet is described in further detail and claimed in my above mentioned application Serial No. 536,748.

Furthermore, since the sheets before they are assembled are given a permanent set with a substantially semicircular configuration, it will be apparent that the sheets will stand by themselves without assembling them in a form or ring. Therefore this facilitates the assembly of the sheet so that the sheets may be stacked from the inside out to produce the toroidally shaped construction as is illustrated in Fig. 5. In other words, the sheets making up the inner layer are stacked first and the layers are stacked progressively towards the outer periphery of the core.

In order to give the magnetic sheets the configuration they are to have in the finished core, the core of Fig. 5 may after assembly be expanded in any suitable manner, and in Fig. 6 I have illustrated an expansion mandrel 22 to accomplish this. In order to hold the sheets in their position during this expansion it will be seen that bands 23 are provided around the outer periphery and which are spot welded at 24. When the wedge shaped portion 25 of the expansion mandrel 22 is forced into the mandrel, it will be apparent that the core will be forced to assume a generally rectangular shape. However, the use of such an expansion mandrel may break the joints apart at 18 and 19 as well as the other joints so that it is desirable to apply pressure to the outside surfaces of the core in the manner illustrated in Fig. 7. Thus the core may be placed on a suitable base and a piston 26 pushed downwardly to force the core to more closely assume the shape of the mandrel. Relatively movable pistons 27 and 28 may also be applied for applying force in a plane at right angles to the force applied due to the movable piston 26. When the core has the desired shape it may be held in that position through a support which includes plates 29 and 30 and connecting straps 31 and 32. As will be seen in Fig. 7 the straps 31 and 32 may be attached to the plate 29 and when the core has attained its desired shape the adjacent ends of the straps 31 and 32 may be attached to the plate 30 in any suitable manner such as by spot welding. After the core has attained its desired shape and has been held together by the plates 29 and 30, the core may be given a suitable strain relief anneal so as to give the various sheets a permanent set in their desired relative positions and so as to also remove any deleterious strains.

After the core has been removed from the annealing oven it is in condition to be assembled with any suitable type of coil construction such as that illustrated in Fig. 1. Thus as is illustrated in Fig. 9 the core portions 6 and 7 are disassembled and reassembled around one leg 4 of the conductive winding structure. On the right hand side of Fig. 9 there is illustrated one of the U-shaped core portions assembled around the other winding leg and the other core portion in the process of being assembled. In order to hold the various laminations in their desired position it will be seen that suitable rivets 32 are provided in the holes 10 and 11 which are used to facilitate the assembly of the sheets.

It will be understood that the joints may be placed in any suitable position around the periphery of the core, and when the joints are placed in the legs, as is illustrated in the construction of Figs. 1 and 9, the U-shaped core portions 6 and 7 are assembled by pushing them together in a direction generally parallel with the plane of the sheet in the legs. In order therefore to facilitate the assembly so that the ends of the sheets will go back in their desired position, a suitable number of sheets should be employed for each of the layers so that the overhanging ends of the sheets will be relatively stiff so that they will go back to the desired position. For example, I have found when assembling two U-shaped core portions of the type illustrated in Fig. 9 that when two or three are employed for each layer, each sheet having about 10 mil thickness, the sheets will return to their desired positions in assembly in the manner shown in Fig. 9.

When it is desired to employ a fewer number of sheets in each layer than may be efficiently assembled as shown in Fig. 9 by introducing the U-shaped portion 6 as a unit to fit with the U-shaped core portion 7, a few sheets at a time may be introduced in the manner illustrated in Fig. 10. With such a construction it is desirable to have the overlap butt joints as near the end of the winding window as is possible so as to facilitate the assembly of each of the sheets.

In Fig. 11 I have illustrated another type of core construction with the joints in the yokes of the cores rather than in the winding legs, and which sheets may be assembled in any suitable manner such as in the method described above. The core of Fig. 11 includes two U-shaped core portions 33 and 34 with joints in the yoke portions 35 and 36. The U-shaped core portion 33 is formed of a group of magnetic sheets 37 illustrated in Fig. 12, while the core portion 34 is made up of a similar group 38 of magnetic sheets illustrated in Fig. 12. The sheets may be assembled in any suitable manner such as by giving the sheets a permanent set of a semicylindrical condition as is illustrated in Fig. 13 by a sheet 39 from the group 37. The sheet 39 may then be assembled with a corresponding sheet 40 of the group 38 so that the sheets 39 and 40 will provide one layer of the assembled core construction, as is illustrated in Fig. 14. Similarly, the next sheet 41 of group 37 may be assembled adjacent the sheet 39 with a sheet 42 from the group 38 assembled adjacent the sheet 40. In order to facilitate the assembly of the sheets, holes 43 may be placed in the sheets of the group 39 which holes are placed the same distance from the ends of the respective sheets. These holes may be produced in any suitable manner, such as at the same time the sheets are cut by my index shearing machine of the type described and claimed in the above-mentioned application. In like manner holes 44 may be placed in the group of sheets 38. When the sheets are assembled in the manner illustrated in Fig. 14, pins 45 and 46 may be inserted into the holes in the sheets so as to hold them in position. The sheets at the opposite end as is illustrated in Fig. 14 may be held together in any suitable manner such as by the use of a magnetic holding device 47. If desired the inner sheets 39 and 40 may be supported through the use of a small plate 48 which may be temporarily tack welded to the sheets 39 and 40 as is indicated by the numeral 49. Also holes 43' and 44' may be provided at the other ends of the sheets to accommodate pins, in which case the magnetic holding device is not needed.

In order to produce the particular joint construction as is illustrated in the core of Figs. 11 and 14, the corresponding sheets of each of the groups of sheets 37 and 38 of Fig. 12 are so cut that the total length of the corresponding sheets of each group which make up a complete layer will be slightly longer than the peripheral length of that layer. It will therefore be seen that adjacent ends 50 and 51 of the sheets 39 and 40, respectively, are placed in substantially abutting relation, while the opposite ends 52 and 53 are placed in overlapping relation. In order to produce a break in the joints it will be seen that the adjacent layer which is made up of the sheets 41 and 42 are so assembled that ends 54 and 55 which are adjacent the overlapping ends 52 and 53 are placed in abutting relation while the opposite ends 56 and 57 are placed in overlapping relation. With such a joint construction adjacent ends of sheets of each of the layers will be in abutting relation while other adjacent ends will be placed in overlapping relation.

After the sheets have been assembled to produce a generally toroidally shaped core as is illustrated in Fig. 14 by assembling the sheets from the inside layer to the outside layer, the core may be annealed in this condition if a circular core is desired in the finished apparatus, or the core may be expanded into a rectangularly shaped core in the manner described above in connection with Figs. 6, 7, and 8. The core to produce this type of joint may be formed in any other suitable manner, if desired. It will be understood, however, that since every other joint in each of the yokes has sheets in overlapping relation the joints are in effect self locking so that an expanding mandrel 22 may be employed to produce a rectangularly shaped core and the joints will not pull apart as they may in the construction as is illustrated in Fig. 1. The cores may then be given a strain relief anneal by stacking in an oven as is diagrammatically illustrated in Fig. 15. A suitable weight 58 may be placed on top of the cores so that the winding leg portions of the core will be relatively tightly compressed, and the resultant electromagnetic induction apparatus will therefore have a high space factor.

In order to assemble the core constructions after they are removed from the strain relief anneal, as is illustrated in Fig. 15, the cores may be disassembled so as to produce two U-shaped cores 59 and 60 as is illustrated in Fig. 16. The core 59 may then be passed through a winding window 61 of a conductive winding structure 62, and reassembled with the U-shaped core portion 60 by pushing the ends together in a general direction parallel with the plane of the magnetic sheets and the yokes.

In the construction illustrated in Fig. 16, it will be seen that two core portions are placed around winding legs 63 and 64, and after the one core has been assembled around the winding leg 64 a second core may be assembled around the winding leg 63. Since the window is already half full, if the window has been so designed that the finished core will substantially fill the winding window it will be understood that with the construction as is illustrated in Fig. 16, the yoke would have to be slightly flexed so that it will pass through the space between the outer periphery of the core member 59 and the inner surface of the winding leg 63. In order to facilitate therefore the assembly of a U-shaped core portion 65 approximately half of the sheets of the core portion 65 may be first assembled without any substantial flexing of the sheet. The remaining half of the sheets which make up he U-shape core portion 65 may then be assembled by slightly flexing one end as it is passed through the remaining space. Thus, a sheet 66 will be passed through the window in the manner illustrated in Fig. 16 and one end 67 it will be understood will be slightly flexed in order for it to pass through the relatively small space. However, only a slight flexing need be produced and since only a relatively small portion of the total core is so flexed, it will be understood that only a minimum amount of deleterious strains will be produced in the finished core construction. After the core portion 65 has been assembled with the conductive winding structure it may be reassembled with another U-shaped portion in the manner described above in connection with the U-shaped core portion 60.

I have found that a joint construction of the type illustrated in Figs. 11 through 16 produces a very efficient core construction, and I have tabulated below the core loss in watts per pound and exciting current in ampere turns per inch of a transformer formed in the manner described above in connection with Figs. 11 through 16, and having such a joint construction:

| Density in Kilo-lines per Square Inch | Exciting Current A. T. per Inch | Core Loss Watts per Pound |
|---|---|---|
| 85 | 1.0 | 0.505 |
| 90 | 1.21 | 0.635 |
| 95 | 1.70 | 0.73 |
| 100 | 2.4 | 0.835 |
| 105 | 3.6 | 0.96 |
| 110 | 6.0 | 1.11 |
| 114 | 7.24 | 1.16 |

The above data were obtained from a 3 kv.-a. 120 volt, 72 turn winding transformer having a core weight of 35.25 pounds and a mean length of magnetic path of 19.69 inches.

In Fig. 17 I have illustrated an electromagnetic induction apparatus having a core structure with a butt overlap joint of the type illustrated in Figs. 11 and 16 except that the joints are so placed in line with opposite surfaces of the winding that the substantially L-shaped core portions may be assembled without flexing any of the layers. Thus the core construction includes core portions 68 and 69 which surround a leg 70 of a conductive winding structure. One joint construction 71 is in line with the inner surface of the winding leg 70 while another joint construction 72 is in line with the outer surface of the winding leg 70. Similar core portions 68' and 69' surround the other winding leg 70' and the core portions 68 and 68' are introduced into the winding window from opposite sides. The core portions 69 and 69' may therefore be assembled with the core portions 68 and 68', respectively, by assembling a few layers at a time. It will be understood that in the construction illustrated in Fig. 17 a similar joint is provided as shown in Fig. 11, that is, in any one layer adjacent ends at joint 71 are in abutting relation while the opposite ends at joint 72 are in overlapping relationship.

I have found that a joint construction of the type illustrated in Fig. 17 produced a very efficient core construction and I have tabulated below core loss in watts per pound and the exciting current in ampere turns per inch of a transformer as is illustrated in Fig. 17:

| Density in Kilo-lines per Square Inch | Exciting Current A. T. per Inch | Core Loss Watts per Pound |
|---|---|---|
| 80 | 0.93 | 0.50 |
| 85 | 1.08 | 0.56 |
| 90 | 1.35 | 0.64 |
| 95 | 1.86 | 0.74 |
| 100 | 3.00 | 0.882 |
| 105 | 4.95 | 1.005 |

The above data were obtained from a 1.5 kv.-a. 120 volt, 92 turn winding transformer having a core weight of 26.54 pounds.

It will be understood that my butt overlap joint construction of the type illustrated in Fig.

11 may be employed with any other type of core configuration, and in Fig. 18 I have illustrated this joint as applied to a U-shaped core with a removable yoke which is the same type of construction illustrated in my copending application, Serial No. 536,748, in Fig. 21 of that application. The core construction illustrated in Fig. 18 includes a U-shaped core portion 73 and a removable yoke portion 74, the core portion 73 having such a configuration that the joint will be in the same general plane as the winding legs. Each of the layers of the core includes a sheet from one group 75 as is illustrated in Fig. 19 and another sheet from a group 76. The sheets may be assembled in any suitable manner such as according to the method as is described in my above mentioned copending application. Thus a sheet 77 from the group 75 may be placed with an end 78 abutting an end 79 of a corresponding sheet 80 of the group 76. The ends 78 and 79 will be placed in abutting relationship and their opposite ends 81 and 82 will be placed in overlapping relationship. In order that the adjacent sheets will have joints which are staggered, it will be understood that holes 83 are placed in the group of sheets 76 displaced from the longitudinal center line and by longitudinally reversing adjacent sheets in the manner described in my above mentioned copending application, Serial No. 536,748, the joints may be staggered to produce the core construction of the type illustrated in Fig. 18.

In the constructions illustrated above, the cores have been assembled with preformed conductive winding structures, while in Fig. 20 I have illustrated an arrangement for winding a conductor on two U-shaped core members. Thus U-shaped core members 84 and 85 are provided with winding legs adjacent each other, and when the U-shaped core portions are rotated, a conductor 86 may be wound on the winding legs to produce a coil construction.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. The method of producing an assembled magnetic core and winding for an electromagnetic induction apparatus including the steps of providing two groups of substantially straight sheets of magnetic material each having a length less than the total length of the perimeter of the finished core and with the sheets of at least one of the groups having progressively different lengths, individually flatwise bending said sheets into semi-cylindrical shape, and assembling the sheets from both groups beginning with the smaller sheets and using progressively longer sheets to provide a closed magnetic core of a plurality of layers with each layer including one sheet for each group, giving the core the final shape it will have in the finished apparatus, annealing in that position and disassembling the groups of sheets into two core portions and assembling around a winding so that the sheets occupy the same relative position they had before disassembly without causing deleterious strains in the core.

2. The method of producing an assembled core and winding for an electromagnetic induction apparatus including the steps of providing two groups of sheets of magnetic material each having a length less than the total length of the perimeter of the finished core and with the sheets of one group having progressively different lengths and the sheets of the other group having approximately the same length, flatwise bending the sheets of at least one group and assembling the sheets from both groups beginning with the smaller sheets and using progressively larger sheets to provide a closed magnetic core of a plurality of layers and with each layer including one sheet from each group with the adjacent sheets of each group having ends in substantially abutting relationship, annealing in that position, disassembling the groups of sheets into two core portions and assembling with a winding so that the sheets occupy the same relative position as they had before disassembly without causing deleterious strains in the core.

3. A laminated magnetic core having a joint extending entirely across a section of said core and extending but a relatively short distance along said core, said core joint comprising collectively individual joints in all the lamination layers at that part of the core, said individual joints being alternate butt joints and overlap joints, said individual joints being themselves in overlapping relation whereby a section of the core through all of said butt joints has the same magnetic area as the main part of said core while being only fifty per cent thicker than the main part of said core by reason of the double thickness of the individual overlap joints in alternate layers.

4. A laminated magnetic core having a core joint consisting of as many substantially aligned lamination joints as there are lamination layers, said lamination joints being butt joints and overlap joints in substantially equal numbers whereby the flux density in the core joint is substantially the same as in the core on both sides of the core joint.

5. A closed laminated magnetic core having two lamination pieces per layer, there being two joints in each layer between the ends of the pieces forming each layer, one joint in each layer being a butt joint and the other joint in each layer being an overlap joint, said joints being oriented into two groups of adjacent joints with each group forming a core joint which extends completely through the core, the individual layer joints which form each core joint being alternate butt and overlap joints.

GARETH G. SOMERVILLE.

REFERENCES CITED

The following references are of record in the file of this patent:

UNITED STATES PATENTS

| Number | Name | Date |
|--------|------|------|
| 523,572 | Hassler | July 24, 1894 |
| 1,102,513 | Johannesen | July 7, 1914 |
| 1,365,569 | Troy | Jan. 11, 1929 |
| 1,933,140 | Gakle | Oct. 31, 1933 |
| 1,935,426 | Acly | Nov. 14, 1933 |
| 2,332,127 | Annis | Oct. 19, 1943 |

FOREIGN PATENTS

| Number | Country | Date |
|--------|---------|------|
| 7,856 | Great Britain | 1889 |
| 106,986 | Great Britain | June 14, 1917 |